United States Patent
Hirayama

(10) Patent No.: US 7,365,592 B2
(45) Date of Patent: Apr. 29, 2008

(54) POWER SUPPLY CIRCUIT

(75) Inventor: Ryuichi Hirayama, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 121 days.

(21) Appl. No.: 11/317,519

(22) Filed: Dec. 23, 2005

(65) Prior Publication Data

US 2006/0139830 A1 Jun. 29, 2006
US 2006/0250739 A9 Nov. 9, 2006

(30) Foreign Application Priority Data

Dec. 28, 2004 (JP) .............................. 2004-380377

(51) Int. Cl.
*G05F 1/10* (2006.01)
*G05F 3/02* (2006.01)
(52) U.S. Cl. ........................................ 327/536; 363/59
(58) Field of Classification Search ................ 327/536, 327/589; 363/59–60
See application file for complete search history.

(56) References Cited

U.S. PATENT DOCUMENTS 6,043,705 A * 3/2000 Jiang ........................... 327/589

\* cited by examiner

*Primary Examiner*—Tuan T. Lam
*Assistant Examiner*—Diana J Cheng
(74) *Attorney, Agent, or Firm*—Frishauf, Holtz, Goodman & Chick, P.C.

(57) ABSTRACT

A power supply circuit includes at least one capacitor, a plurality of switching members, a power supply which outputs a plurality of voltages and a selecting section for controlling said plurality of switching sections to periodically select one of said plurality of voltages and apply the selected voltage to one terminal and the other terminal of the capacitor. The selecting section includes a member for applying the selected voltage to one terminal and the other terminal of the capacitor across a resistor, during a current limiting period immediately after the application of the selected one of said plurality of voltages to one terminal and another terminal of the capacitor is started.

10 Claims, 4 Drawing Sheets

|  | ELAPSED TIME t<T₀ | | ELAPSED TIME t≧T₀ | |
|---|---|---|---|---|
|  | FIRST PERIOD | SECOND PERIOD | FIRST PERIOD | SECOND PERIOD |
| SW1 | OFF | OFF | OFF | ON |
| SW5 | OFF | ON | OFF | ON |
| SW4 | OFF | ON | OFF | ON |
| SW2 | ON | OFF | ON | OFF |
| SW3 | OFF | OFF | ON | OFF |
| SW6 | ON | OFF | ON | OFF |

|     | FIRST PERIOD | SECOND PERIOD |
|-----|--------------|---------------|
| SW1 | OFF          | ON            |
| SW4 | OFF          | ON            |
| SW2 | ON           | OFF           |
| SW3 | ON           | OFF           |

US 7,365,592 B2

POWER SUPPLY CIRCUIT

CROSS-REFERENCE TO RELATED APPLICATIONS

This application is based upon and claims the benefit of priority from prior Japanese Patent Application No. 2004-380377, filed Dec. 28, 2004, the entire contents of which are incorporated herein by reference.

BACKGROUND OF THE INVENTION

1. Field of the Invention

The present invention relates to a power supply circuit and a method of driving the same and, more particularly, to a power supply circuit which includes a charge pump circuit and generates a predetermined voltage, and a method of driving the same.

2. Description of the Related Art

Of various types of circuits, some circuits such as display driving circuits require a plurality of power supply voltages when they are driven. An example of a power supply circuit which supplies a plurality of power supply voltages is a power supply circuit including a charge pump circuit. This power supply circuit has one or a plurality of capacitors, and adds capacitor charge voltages to generate another voltage.

This charge pump type power supply circuit used in a display driving circuit and the like is so designed that the connections between the capacitor and a plurality of power supply voltages are periodically switched. This switching of the connections between the capacitor and a plurality of voltages is controlled by on/off operation of switches.

FIGS. 4A and 4B are schematic views showing an example of a conventional charge pump type power supply circuit.

As shown in FIG. 4A, a power supply circuit 900 includes switches SW1 to SW4 and capacitors C1 and C2. The switch SW1 has one terminal to which a voltage VCC is applied, and the other terminal connected to a terminal C1M. The switch SW2 has one terminal connected to the terminal C1M, and the other terminal to which a voltage VSS (GND) is applied. The switch SW3 has one terminal to which a voltage VDC is applied, and the other terminal connected to a terminal C1P. The switch SW4 has one terminal connected to the terminal C1P, and the other terminal connected to a terminal VOUT. The capacitor C1 has one terminal connected to the terminal C1M, and the other terminal connected to the terminal C1P. The capacitor C2 has one terminal connected to the terminal VOUT, and the other terminal to which the voltage VSS is applied.

In the power supply circuit 900 as shown in FIG. 4B, in a first period, the switches SW2 and SW3 are turned on, and the switches SW1 and SW4 are turned off. Since the potential of the terminal C1P is set at VDC and that of the terminal C1M is set at VSS, the capacitor C1 is charged to the voltage VDC.

Then, in a second period, the switches SW1 and SW4 are turned on, and the switches SW2 and SW3 are turned off. Accordingly, the potential of the terminal C1M is set at VCC, and the terminal C1P is connected to one terminal of the capacitor C2. Since the voltage VDC is held in the capacitor C1, the potential of the terminal C1P becomes (VDC+VCC), so a voltage (VDC+VCC=VGH) is applied to one terminal of the capacitor C2 to charge it to the voltage VGH. As a result, the output terminal VOUT outputs the voltage VGH.

Then, when the switches SW1 and SW4 are turned off and the switches SW2 and SW3 are turned on again in the first period, the voltage in the capacitor C2 is held, and the output voltage from the output terminal VOUT is also maintained. By periodically charging the capacitor C2 by repeating the above operation, the power supply circuit 900 can supply a predetermined voltage from the output terminal VOUT.

In the charge pump type power supply circuit as described above, in the first and second periods, a transient current flows from the power supply to each capacitor albeit for a short time during a period immediately after each switch is turned on to apply each individual voltage to the capacitor. This transient current is a very large electric current if the line between the capacitor and power supply has a low resistance. If this transient current is generated in the charge pump type power supply circuit, latch-up occurs in transistors forming the switches or in a control circuit, thereby making the power supply circuit inoperable. Also, the large electric current flowing from the power supply circuit causes defective operation of the power supply, so an operation error of the circuit occurs.

BRIEF SUMMARY OF THE INVENTION

The present invention has the advantage that the reliability of a power supply circuit including a charge pump circuit can be improved by suppressing a transient current when the power supply circuit is in operation, thereby preventing the power supply circuit from being inoperative by latch-up or preventing a defective operation of the power supply circuit caused by an overcurrent.

To obtain the above advantage, a power supply circuit according to an aspect of the present invention comprises:

at least one capacitor;

a plurality of switching members;

a power supply which outputs a plurality of voltages; and a selecting section for controlling said plurality of switching section to periodically select one of said plurality of voltages and apply the selected voltage to one terminal and the other terminal of the capacitor, wherein the selecting section comprises a member for applying the selected voltage to one terminal and the other terminal of the capacitor across a resistor, during a current limiting period immediately after the application of the selected one of said plurality of voltages to one terminal and another terminal of the capacitor is started.

The power supply circuit preferably further comprises a signal generating section for outputting a driving pulse signal which controls the plurality of switching sections, and a counting section for counting pulses of the output driving pulse signal from the signal generating section, the current limiting period is set on the basis of the count of the counting section, and the current limiting period has a time of 1 to 30 msec.

The capacitor preferably comprises first and second capacitors, the plurality of voltages comprise first, second, and third voltages, and the selecting section comprises first selecting a member for alternately selecting the first and second voltages as a voltage to be applied to one terminal of the first capacitor, in accordance with the driving pulse signal, and a second selecting member for alternately selecting application of the third voltage to the other terminal of the first capacitor, and connection of one terminal of the second capacitor to the other terminal of the first capacitor, in accordance with the driving pulse signal.

The first selecting member may also comprise means for inserting the resistor between one terminal of the first capacitor and the first voltage during the current limiting period, and directly connecting one terminal of the first capacitor and the first voltage after the current limiting period has passed, and the second selecting member may also comprise means for inserting the resistor between the other terminal of the first capacitor and the third voltage during the current limiting period, and directly connecting one terminal of the first capacitor and the first voltage after the current limiting period has passed.

In the selecting section, after the current liming period has passed, the first selecting member may also comprise means for inserting the resistor between one terminal of the first capacitor and the first voltage, and directly connecting one terminal of the first capacitor and the first voltage, and means for inserting the resistor with respect to the other terminal of the first capacitor in the second selecting member, and directly connecting the other terminal of the first capacitor in the second switching section.

To obtain the above advantage, a power supply circuit driving method according to a second aspect of the present invention, a method of driving a power supply circuit, comprising:

the power supply circuit comprising a capacitor;

periodically selecting one of a plurality of voltages and applying the selected voltage to one terminal and the other terminal of the capacitor;

applying the selected one of said plurality of voltages to one terminal of the capacitor across a resistor, during a current liming period immediately after the application of the selected voltage to one terminal and the other terminal of the capacitor is started; and directly applying one of said plurality of voltages to one terminal and the other terminal of the capacitor after the current limiting period has passed.

The above driving method preferably comprises a step of counting pulses of a driving pulse signal related to the periodic selection of the plurality of voltages, and setting the current limiting period on the basis of the count, and the current limiting period has a time of 1 to 30 msec.

The capacitor comprises first and second capacitors, the plurality of voltages comprises first, second, and third voltages, and the step of periodically selecting one of the plurality of voltages and applying the selected voltage to one terminal and the other terminal of the capacitor comprises a step of periodically selecting one of the first and second voltages as a voltage to be applied to one terminal of the first capacitor, and a step of periodically selecting one of application of the third voltage to the other terminal of the first capacitor, and connection of one terminal of the second capacitor to the other terminal of the first capacitor.

The step of periodically selecting one of the first and second voltages as a voltage to be applied to one terminal of the first capacitor comprises a step of inserting the resistor between one terminal of the first capacitor and the first voltage during the current limiting period, and a step of directly connecting one terminal of the first capacitor and the first voltage after the current limiting period has passed, and the step of periodically selecting one of the application of the third voltage to the other terminal of the first capacitor, and the connection of one terminal of the second capacitor to the other terminal of the first capacitor comprises a step of inserting the resistor between the other terminal of the first capacitor and the third voltage during the current limiting period, and a step of directly connecting the other terminal of the first capacitor and the third voltage after the current limiting period has passed.

BRIEF DESCRIPTION OF THE SEVERAL VIEWS OF THE DRAWING

FIGS. 1A and 1B are views for explaining an embodiment of a power supply circuit according to the present invention, in which FIG. 1A shows an arrangement and FIG. 1B shows the states of switches;

DETAILED DESCRIPTION OF THE INVENTION

A power supply circuit and a method of driving the power supply circuit according to the present invention will be described below on the basis of an embodiment shown in the accompanying drawing.

Note that a circuit having two capacitors will be explained below as a charge pump type power supply circuit, but the present invention is not limited to this configuration. For example, the power supply circuit may also include three or more capacitors.

First, an outline of the arrangement of the power supply circuit according to this embodiment will be explained.

Figures 1A, 1B:
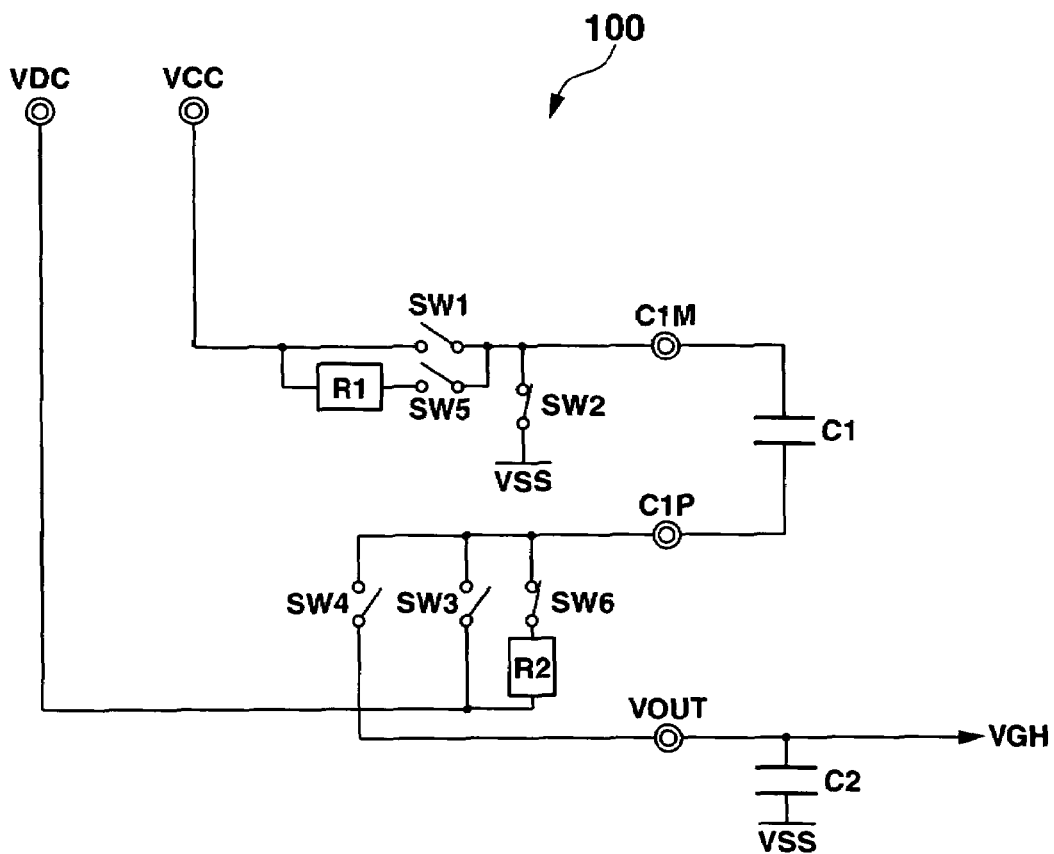

FIGS. 1A and 1B are views for explaining the embodiment of the power supply circuit according to the present invention. FIG. 1A shows an arrangement, and FIG. 1B shows the states of switches.

In the following explanation, the same reference numerals as in the power supply circuit according to the prior art denote the same parts. As shown in FIG. 1A, a power supply circuit 100 according to this embodiment includes switches SW1 to SW6 and capacitors C1 and C2. The switch SW1 has one terminal to which a voltage VCC is applied, and the other terminal connected to a terminal C1M. The switch SW5 has one terminal to which the voltage VCC is applied via a resistor R1, and the other terminal connected to the terminal C1M. The switch SW2 has one terminal connected to the terminal C1M, and the other terminal to which a voltage VSS (GND) is applied. The switch SW3 has one terminal to which a voltage VDC is applied, and the other terminal connected to a terminal C1P. The switch SW6 has one terminal to which the voltage VDC is applied via a resistor R2, and the other terminal connected to the terminal C1P. The switch SW4 has one terminal connected to the terminal C1P, and the other terminal connected to a terminal VOUT. The capacitor C1 has one terminal connected to the terminal C1M, and the other terminal connected to the terminal C1P. The capacitor C2 has one terminal connected to the terminal VOUT, and the other terminal to which the voltage VSS is applied. In this configuration, the switches SW1 to SW6 form a switching means or section according to the present invention.

Next, the operation of the power supply circuit 100 will be explained. First, as shown in FIG. 1B, in a first period during a period in which an elapsed time t from immediately after the power supply circuit 100 starts operating has not reached a preset current limiting period $T_0$ yet, the switches SW2 and SW6 are turned on, and the switches SW1, SW3, SW4, and SW5 are turned off. Therefore, the voltage VDC is applied to the terminal C1P via the resistor R2, and the potential of the terminal C1M is set at VSS (GND). Accordingly, the potential of the terminal C1P becomes a potential (VDC−ΔVR2) which is lower than the voltage VDC by a voltage drop ΔVR2 across the resistor R2, so the capacitor C1 is charged to the voltage (VDC−ΔVR2). Then, in a second period, the switches SW4 and SW5 are turned on, and the switches SW1, SW2, SW3, and SW6 are turned off. Therefore, the voltage VCC is applied to the terminal C1M via the resistor R1, and the potential of the terminal C1M becomes a potential (VCC−ΔVR1) which is lower than the voltage VCC by a voltage drop ΔVR1 across the resistor R1, and the terminal C1P is connected to one terminal of the capacitor C2. Since the voltage (VDC−ΔVR2) is held in the capacitor C1, the potential of the terminal C1P becomes (VDC−ΔVR2+VCC−ΔVR1). Consequently, the voltage (VDC−ΔVR2+VCC−ΔVR1) is applied to one terminal of the capacitor C2 to charge it to this voltage. During the period in which the elapsed time t has not reached the predetermined current limiting period $T_0$ yet, the operations in the first and second periods described above are repeated to hold the voltage of the capacitor C2.

In a first period after the elapsed time t from the operation start has passed the current limiting period $T_0$, as shown in FIG. 1B, the switches SW2, SW3, and SW6 are turned on, and the switches SW1, SW4, and SW5 are turned off. Therefore, the voltage VDC is directly applied to the terminal C1P to set the potential of the terminal C1P at VDC, so the capacitor C1 is charged to the voltage VDC. In a second period, the switches SW1, SW4, and SW5 are turned on, and the switches SW2, SW3, and SW6 are turned off, so the voltage VCC is directly applied to the terminal C1M to set the potential of the terminal C1M at VCC. Since the voltage VDC is held in the capacitor C1, the potential of the terminal C1P becomes (VDC+VCC), so a voltage (VDC+VCC=VGH) is applied to one terminal of the capacitor C2 to charge it to the voltage VGH. The voltage in the capacitor C2 is held by repeating the operations in the first and second periods described above, and the voltage VGH is output from the output terminal VOUT.

In the power supply circuit 100 according to this embodiment as described above, after the elapsed time t from immediately after the operation start has passed the predetermined current limiting period $T_0$, the operation is substantially the same as the power supply circuit 900 according to the prior art. However, during the period in which the elapsed time t has not reached the current limiting period $T_0$ yet, the voltages VCC and VDC are supplied to the individual terminals of the capacitor C1 via the resistors R1 and R2, respectively. This makes it possible to reduce the transient current flowing from the power supply of each of the voltages VCC and VDC to the capacitor C1. In this manner, it is possible to suppress latch-up and prevent an operation error. The current limiting period $T_0$ is set in accordance with, e.g., the time constants of the transient currents related to charging of the capacitors C1 and C2 and the upper limits of electric currents which can be supplied from the power supplies. These time constants and upper limits correspond to the resistance values of the resistors R1 and R2 and the capacitance values of the capacitors C1 and C2. Also, when this power supply circuit is to be used as a power supply circuit of a display driving circuit, the current limiting period $T_0$ must be set to a time which does not interfere with the operation of the display driving circuit. In this case, the current limiting time $T_0$ is set to approximately 1 to 30 msec.

An example of a practical configuration of the power supply circuit according to this embodiment will be described below.

Figure 2:
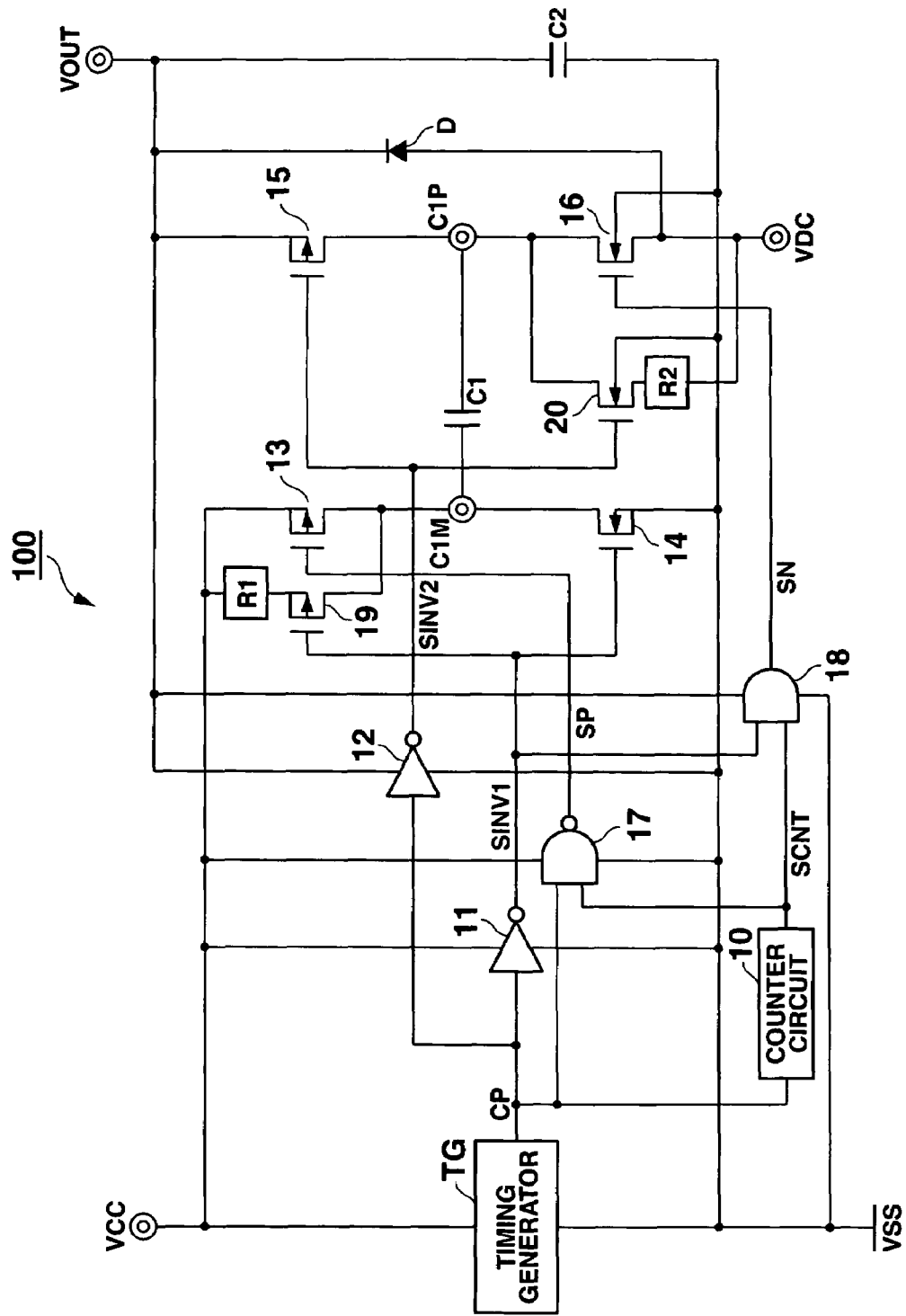
FIG. 2 is a circuit diagram showing an example of a practical arrangement of the power supply circuit according to the embodiment.

FIG. 2 is a circuit diagram showing an example of a practical arrangement of the power supply circuit according to this embodiment. A power supply circuit 100 includes a timing generator TG, a counter circuit 10, inverters 11 and 12, PMOSs 13, 15, and 19, NMOSs 14, 16, and 20, a NAND circuit 17, an AND circuit 18, resistors R1 and R2, capacitors C1 and C2, and a diode D.

The timing generator TG generates and outputs a driving pulse signal CP for setting the operation periods (the first and second periods described above) of the power supply circuit 100. The driving pulse signal CP is output to the inverters 11 and 12, NAND circuit 17, and counter circuit 10. The output terminal of the inverter 11 is connected to the gate terminals of the NMOS 14 and PMOS 19, and to one input terminal of the AND circuit 18. An output signal from the inverter 11 is SINV1. The PMOS 19 has a drain terminal connected to one terminal of the resistor R1, and a source terminal connected to a terminal C1M. A voltage VCC is applied to the other terminal of the resistor R1. The NMOS 14 has a drain terminal connected to the terminal C1M, and a source terminal to which a voltage VSS is applied.

The output terminal of the inverter 12 is connected to the gate terminals of the PMOS 15 and NMOS 20. An output signal from the inverter 12 is SINV2. The PMOS 15 has a drain terminal connected to an output terminal VOUT, and a source terminal connected to a terminal C1P. The NMOS 20 has a drain terminal connected to the terminal C1P, and a source terminal connected to one terminal of the resistor R2. A voltage VDC is applied to the other terminal of the resistor R2. The PMOS 13, NMOS 14, PMOS 19, NMOS 16, PMOS 15, and NMOS 20 correspond to SW1, SW2, SW5, SW3, SW4, and SW6, respectively, shown in FIG. 1.

The counter circuit 10 counts the pulses of the driving pulse signal CP since the start of driving of the power supply circuit 100, and outputs a low-level signal SCNT during a period in which the count is equal to or smaller than a predetermined number n (n is an integer of 1 or more). If the pulse count of the driving pulse signal CP exceeds n, the counter circuit 10 outputs a high-level signal SCNT. The period during which the count is n or less corresponds to the current limiting period $T_0$ described above.

The output signal SCNT from the counter circuit 10 is input to one terminal of the NAND circuit 17 and the other terminal of the AND circuit 18. The output terminal of the NAND circuit 17 is connected to the gate terminal of the PMOS 13 or SW1. An output signal from the NAND circuit 17 is SP. The PMOS 13 has a drain terminal to which the voltage VCC is applied, and a source terminal connected to the terminal C1M. The output terminal of the AND circuit 18 is connected to the gate terminal of the NMOS 16 or SW3. The NMOS 16 has a drain terminal connected to the terminal C1P, and a source terminal to which the voltage VDC is applied. An output signal from the AND circuit 18 is SN.

The capacitor C1 has one terminal connected to the terminal C1M, and the other terminal connected to the terminal C1P. The capacitor C2 has one terminal connected to the output terminal VOUT, and the other terminal to which the voltage VSS is applied. The diode D has an anode terminal to which the voltage VDC is applied, and a cathode terminal connected to the output terminal VOUT.

Figure 3:
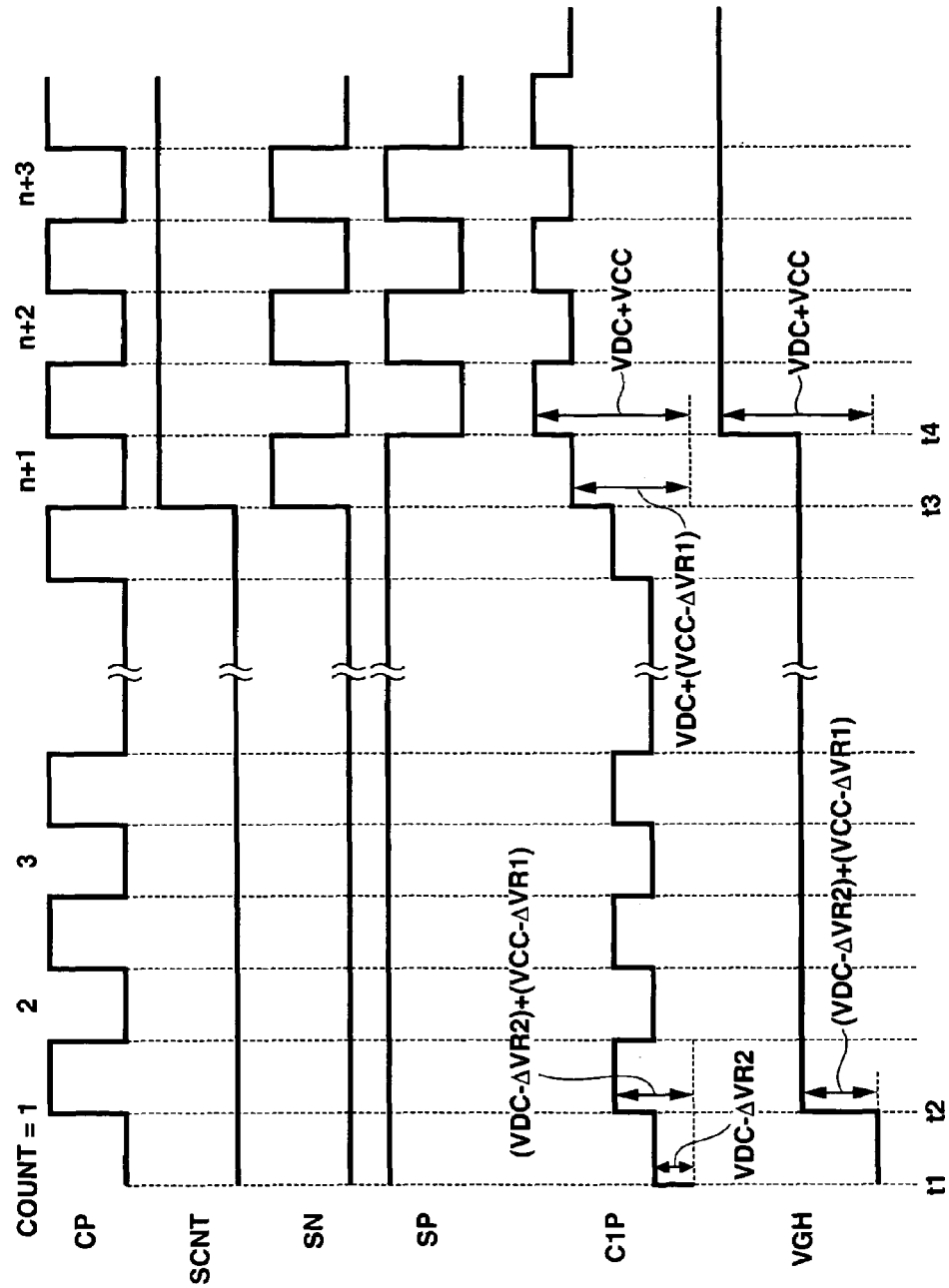
FIG. 3 is a flowchart for explaining the operation of the power supply circuit according to the embodiment.
Figures 4A, 4B:
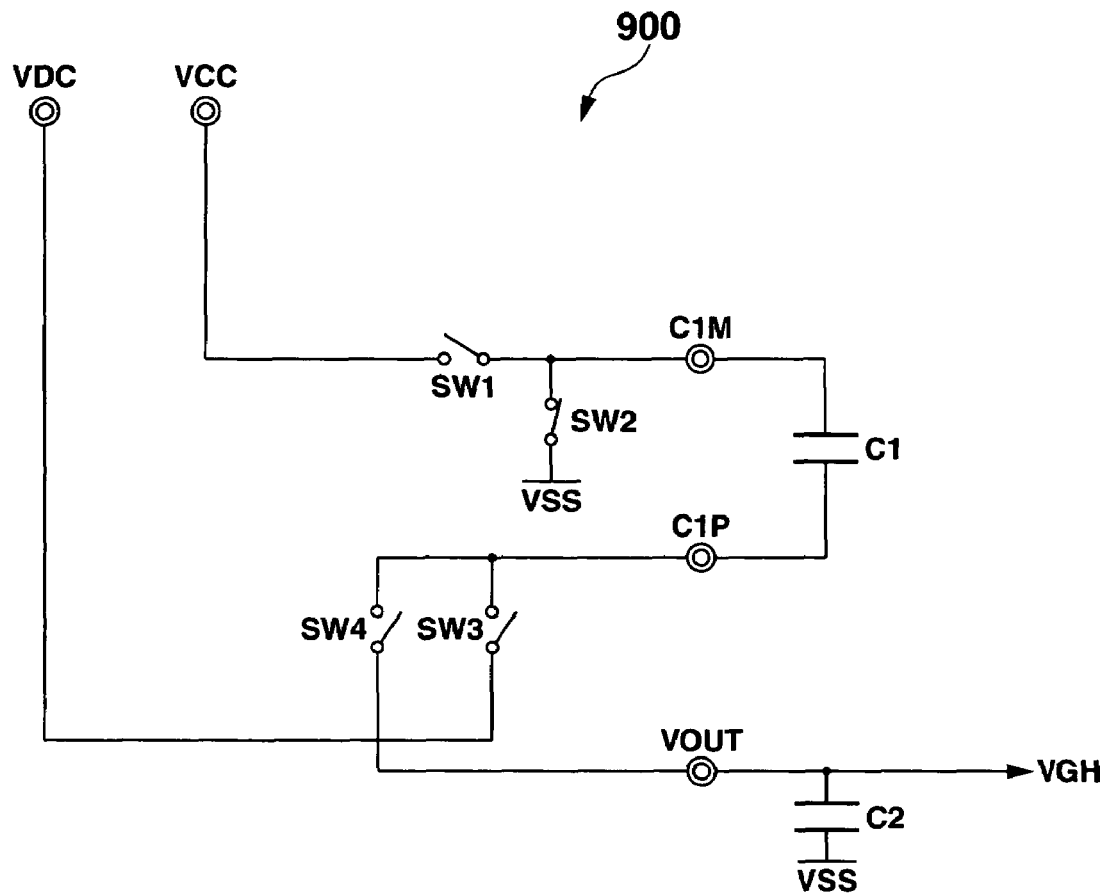
FIGS. 4A and 4B are schematic views showing an example of a conventional power supply circuit.

FIG. 3 is a timing chart for explaining the operation of the power supply circuit according to this embodiment. In response to the start of driving of the power supply circuit 100, the counter circuit 10 counts the pulses of the driving pulse signal CP. In this embodiment, the low levels (the trailing edges) of the driving pulse signal CP are counted up.

During the period in which the count is n or less, the counter circuit 10 outputs the low-level signal SCNT. Accordingly, the signal SN changes to high level, and the signal SP changes to low level, so the PMOS 13 and NMOS 16 are turned off.

At time t1 at which the driving pulse signal CP is at low level (the first period), the signals SINV1 and SINV2 change to high level, so the NMOSs 14 and 20 are turned on, and the PMOSs 15 and 19 are turned off. Accordingly, the potential of the terminal C1P becomes a potential (VDC−ΔVR2) which is lower than the voltage VDC by a voltage drop ΔVR2 across the resistor R2. This voltage (VDC−ΔVR2) is applied to the other terminal of the capacitor C1, and the electric charges are held in it.

Then, when the driving pulse signal CP changes to high level (the second period) at time t2, the signals SINV1 and SINV2 change to low level, so the PMOSs 15 and 19 are turned on, and the NMOSs 14 and 20 are turned off. The potential of the terminal C1M becomes a potential (VCC−ΔVR1) which is lower than the voltage VCC by a voltage drop ΔVR1 across the resistor R1. The voltage (VCC−ΔVR1) is applied to one terminal of the capacitor C1. Since the electric charges which are held when the voltage (VDC−ΔVR2) is applied is still held in the capacitor C1, the potential of the terminal C1P becomes (VDC−ΔVR2)+(VCC−ΔVR1). In addition, the potential of one terminal of the capacitor C2 also becomes (VDC−ΔVR2)+(VCC−ΔVR1), so the electric charges are held in the capacitor C2. Accordingly, the output terminal VOUT outputs the voltage (VDC−ΔVR2)+(VCC−ΔVR1).

The output voltage from the output terminal VOUT is maintained at (VDC−ΔVR2)+(VCC−ΔVR1) by repeating the above operation. When the count of the counter circuit 10 reaches n+1 at time t3, the signal SCNT changes to high level and keeps it after that. Since the signal SN changes from low level to high level, the NMOS 16 is turned on.

On the other hand, the signal SP is kept at high level, so the PMOS 13 is kept off. Also, since the driving pulse signal CP is at low level, the signals SINV1 and SINV2 change to high level. That is, the NMOSs 14 and 20 are turned on, and the PMOSs 15 and 19 are turned off. Although the NMOS 20 is turned on accordingly, the NMOS 16 is also turned on, so the voltage VDC is directly applied to the terminal C1P, instead of a voltage applied across the resistor R2. The voltage VDC is added to the voltage held in the capacitor C1 to set the potential of the terminal C1P at {VDC+(VCC−ΔVR1)}.

Then, when the driving pulse signal CP changes to high level at time t4, the signal SN changes to low level to turn off the NMOS 16. Also, the signal SP changes to low level to turn on the PMOS 13. Since the signals SINV1 and SINV2 change to low level, the PMOSs 15 and 19 are turned on, and the NMOSs 14 and 20 are turned off. Although the PMOS 19 is turned on accordingly, the PMOS 13 is also turned on, so the voltage VCC is directly applied to the terminal C1M, instead of a voltage applied across the resistor R1. Since the voltage VCC is added to the voltage held in the capacitor C1, the potential of the terminal C1P becomes (VDC+VCC), so the voltage (VDC+VCC) is applied to one terminal of the capacitor C2, and the electric charges are held in it. As a result, the output terminal VOUT outputs the voltage (VDC+VCC). This operation is repeated after time t4, and the output terminal VOUT keeps outputting the voltage (VDC+VCC).

As described above, during the period in which the count of the counter circuit 10 is n or less, the voltages are applied to the individual terminals of the capacitors C1 via the resistors R1 and R2, so the value of the transient current can be reduced. This makes it possible to prevent latch-up and an operation error of the circuit, and improve the reliability of the power supply circuit.

The power supply circuit 100 of this embodiment is an adder type circuit. However, the power supply circuit 100 may also be another form of a charge pump type power supply circuit, provided that the power supply voltages are applied to the two terminals of a capacitor across resistors during a predetermined period after the start of driving of the power supply circuit.

Also, after time t3 in the power supply circuit 100, both the NMOSs 16 and 20 are turned on if the driving pulse signal CP is at low level, and both the PMOSs 13 and 19 are turned on if the driving pulse signal CP is at high level. However, it is also possible to turn on the NMOS 16 alone in the former case and the PMOS 13 alone in the latter case.

Furthermore, in the power supply circuit 100, the voltages VDC and VCC are applied to the terminals C1P and C1M via the resistors R1 and R2, respectively. However, a resistor may also be inserted only in one of these paths. That is, it is possible to provide only the resistor R1 in the power supply circuit 100, and omit the resistor R2, NMOS 20, and AND circuit 18, thereby connecting the output terminal of the inverter 12 to the gate terminal of the NMOS 16. Alternatively, it is possible to insert only the resistor R2 in the power supply circuit 100, and omit the resistor R1, PMOS 19, and NAND circuit 17, thereby connecting the output terminal of the inverter 11 to the gate terminal of the PMOS 13.

What is claimed is:

1. A power supply circuit comprising:
    a plurality of capacitors including a first capacitor and a second capacitor, each having first and second terminals;
    first and second selecting sections, each including a plurality of switching members; and
    a power supply comprising a plurality of power terminals which respectively output a plurality of voltages including first, second and third voltages;
    wherein the first selecting section alternately selects the first and second voltages as a voltage to be applied to the first terminal of the first capacitor;
    wherein the second selecting section alternately selects the power terminal outputting the third voltage to be connected to the second terminal of the first capacitor, and the first terminal of the second capacitor to be connected to the second terminal of the first capacitor; and
    wherein the second selecting section comprises a subsection for inserting a first resistor between the second terminal of the first capacitor and the power terminal outputting the third voltage during a current limiting period immediately after application of the voltage to the first capacitor is started, and for directly connecting the second terminal of the first capacitor and the power terminal outputting the third voltage after the current limiting period has passed.

2. A circuit according to claim 1, wherein the first and second selecting sections comprise a member for, after the current limiting period has passed, periodically selecting one of said plurality of voltages and applying the selected voltage to the first capacitor by bypassing the first resistor.

3. A circuit according to claim 1, further comprising:
    a signal generator for outputting a driving pulse signal which controls said plurality of switching members, and a counter circuit for counting pulses of the driving pulse signal output from the signal generator, wherein the current limiting period is set based on the count of the counter circuit.

4. A circuit according to claim 1, wherein a duration of the current limiting period is 1 to 30 msec.

5. A circuit according to claim 1, wherein the first selecting section comprises a sub-section for inserting a second resistor between the first terminal of the first capacitor and the power terminal outputting the first voltage during the current limiting period, and for directly connecting the first terminal of the first capacitor and the power terminal outputting the first voltage after the current limiting period has passed.

6. A circuit according to claim 1, wherein, the first selecting section comprises means for inserting a second resistor between the first terminal of the first capacitor and the power terminal outputting the first voltage, and for directly connecting the first terminal of the first capacitor and the power terminal outputting the first voltage.

7. A method of driving a power supply circuit which comprises a plurality of capacitors including a first capacitor and a second capacitor, each having first and second terminals, the method comprising:

providing a plurality of power terminals which respectively output a plurality of voltages, including first, second and third voltages;

alternately selecting the first voltage and the second voltage as a voltage to be applied to the first terminal of the first capacitor;

alternately selecting the power terminal outputting the third voltage to be connected to the second terminal of the first capacitor, and the first terminal of the second capacitor to be connected to the second terminal of the first capacitor; and inserting a first resistor between the second terminal of the first capacitor and the power terminal outputting the third voltage during a current limiting period immediately after the application of the voltage to the first capacitor is started, and directly connecting the second terminal of the first capacitor and the power terminal outputting the third voltage after the current limiting period has passed.

8. A method according to claim 7, further comprising:

counting pulses of a driving pulse signal related to the first, second and third voltages, and setting the current limiting period based on the counting.

9. A method according to claim 7, wherein a duration the current limiting period is 1 to 30 msec.

10. A method according to claim 7, further comprising:

inserting a second resistor between the first terminal of the first capacitor and the power terminal outputting the first voltage during the current limiting period, and directly connecting the first terminal of the first capacitor and the power terminal outputting the first voltage after the current limiting period has passed.

* * * * *